(12) United States Patent
Harstad et al.

(10) Patent No.: US 11,737,027 B2
(45) Date of Patent: Aug. 22, 2023

(54) SYSTEMS AND METHODS FOR MOBILE BACKUP

(71) Applicant: Neptune Technology Group Inc., Tallassee, AL (US)

(72) Inventors: Troy Harstad, Flowery Branch, GA (US); Charles Cottle, Decatur, GA (US); David Hamilton, Auburn, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 37 days.

(21) Appl. No.: 17/488,916

(22) Filed: Sep. 29, 2021

(65) Prior Publication Data
US 2022/0116879 A1 Apr. 14, 2022

Related U.S. Application Data

(60) Provisional application No. 63/089,574, filed on Oct. 9, 2020.

(51) Int. Cl.
*H04W 52/02* (2009.01)

(52) U.S. Cl.
CPC ... *H04W 52/0258* (2013.01); *H04W 52/0225* (2013.01); *H04W 52/0277* (2013.01)

(58) Field of Classification Search
CPC ......... H04W 52/0258; H04W 52/0225; H04W 52/0277; H04W 52/0241; Y02D 30/70; Y04S 20/30

USPC ... 455/13.4, 127.1, 127.5, 343.1–343.5, 522, 455/572–574

See application file for complete search history.

(56) References Cited

U.S. PATENT DOCUMENTS

| | | | |
|---|---|---|---|
| 7,535,378 B2 | 5/2009 | Cornwall | |
| 8,203,463 B2 | 6/2012 | Bragg et al. | |
| 8,378,846 B2 | 2/2013 | Olson et al. | |
| 9,736,791 B1 | 8/2017 | Ameixieira | |
| 9,801,113 B2 | 10/2017 | Baker et al. | |
| 2008/0058616 A1* | 3/2008 | Nakagawa | A61B 5/0006 600/301 |
| 2011/0140910 A1* | 6/2011 | Olson | G01D 4/004 340/870.02 |
| 2013/0235768 A1* | 9/2013 | Earnshaw | H04W 72/0446 370/280 |
| 2014/0141711 A1* | 5/2014 | Baker | H04W 40/02 455/500 |

* cited by examiner

*Primary Examiner* — Michael Y Mapa
(74) *Attorney, Agent, or Firm* — Snyder, Clark, Lesch & Chung, LLP (57) ABSTRACT

A device may include a communication interface and a processor configured to determine that a first transmission task is scheduled and attempt to execute the first transmission task. The processor may also evaluate a metric associated with an effectiveness of the first transmission task. The processor may further modify or set at least one of a transmission interval or power level associated with a second transmission task based on evaluating the metric.

24 Claims, 7 Drawing Sheets

SYSTEMS AND METHODS FOR MOBILE BACKUP

RELATED APPLICATION

This application claims priority under 35 U.S.C. § 119 based on U.S. Provisional Application No. 63/089,574 filed Oct. 9, 2020, the contents of which are hereby incorporated herein by reference in their entirety.

BACKGROUND INFORMATION

Utility companies and other entities provide resources to customers, such as water, gas and electricity. A meter may be installed at a point in which the resource is provided to the customer to measure customer usage of the resource. In many cases, the meter or a meter interface unit coupled to the meter includes wireless communication capabilities to enable the meter to transmit a current meter reading as well as historical meter readings to a utility's remotely located billing system via a communication network. In situations in which the communication network may be experiencing an outage or other problem, a mobile meter reading system may be used as a backup to obtain current meter readings.

For example, an in-field mobile data collection device may be used to obtain meter reading data. In this case, a person or vehicle carrying or transporting the in-field mobile data collection device comes within radio frequency (RF) range of the meter and receives the current meter data via an RF transmission from the meter or meter interface unit coupled to the meter.

DETAILED DESCRIPTION OF PREFERRED EMBODIMENTS

The following detailed description refers to the accompanying drawings. The same reference numbers in different drawings may identify the same or similar elements.

Implementations described herein provide systems and methods for transmitting data, such as meter reading data to an entity, such as a utility. In one implementation, meter data is periodically transmitted via a cellular connection (referred to herein as cellular transmissions) from a meter interface unit to the entity during normal operating conditions. In situations in which the cellular connection may be experiencing problems and the cellular transmissions from the meter interface unit have failed (e.g., a predetermined number of times), meter data may be transmitted via a wireless link (referred to herein as mobile transmissions) to a data collection device that may be located relatively close to the meter interface unit, such as a distance ranging from less than 100 feet, to more than two miles away from the meter interface unit. In some implementations, the frequency or transmission interval at which mobile transmissions are made is modified and/or a power level at which mobile transmissions are transmitted is modified when the cellular transmissions have failed the predetermined number of times. In this manner, a backup method of transmitting data is provided while not adversely impacting the battery life of the meter interface unit.

Implementations described herein may also overlap mobile transmissions with a successful cellular transmission when personnel have already been dispatched to obtain an in-field meter reading. In this manner, the in-field personnel may successfully obtain a meter reading via a mobile transmission and avoid a situation in which the in-field personnel report a defective meter/meter interface unit when the meter/meter interface unit is functioning properly.

Figure 1:
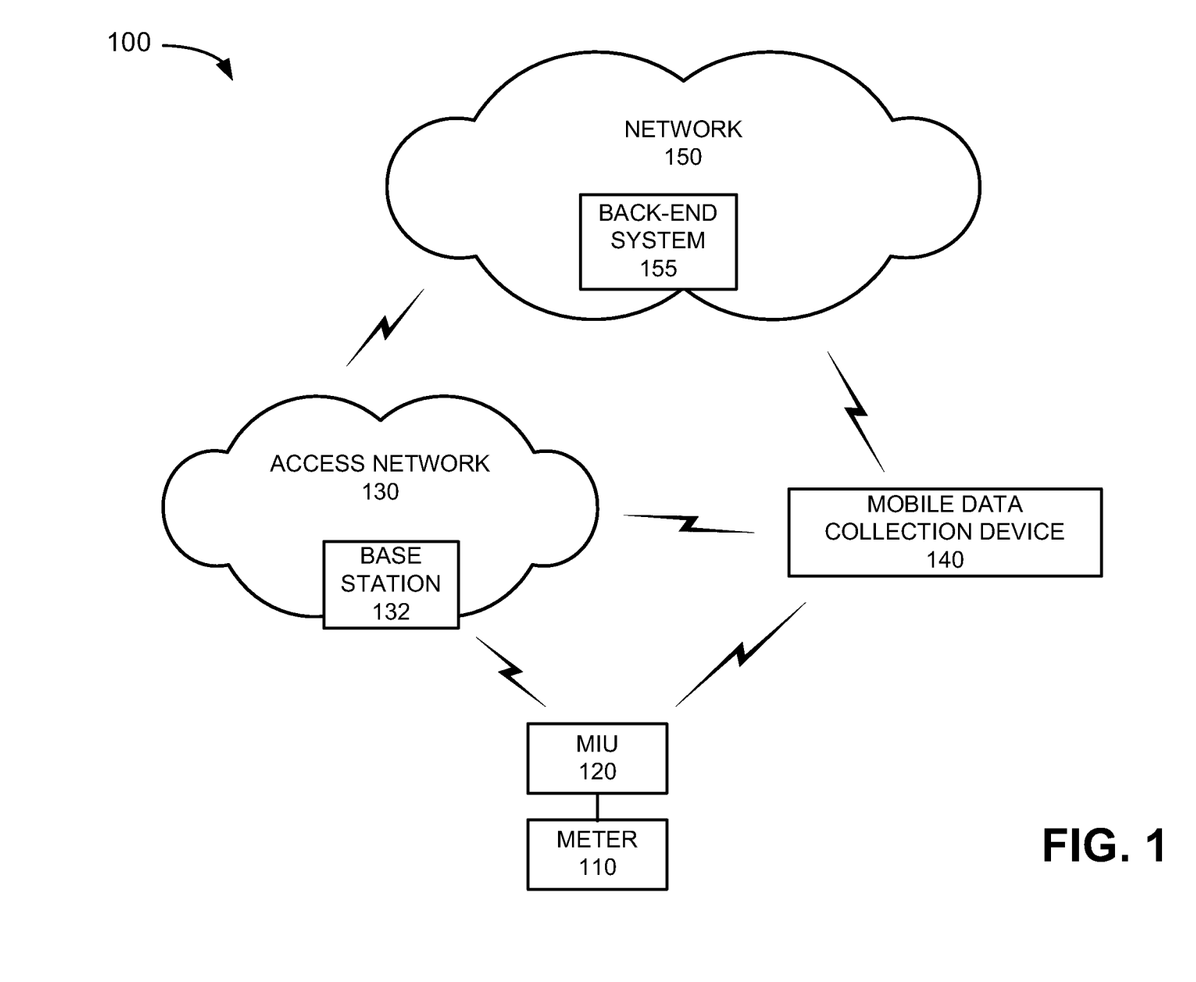
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes meter 110, meter interface unit (MIU) 120, access network 130, base station 132, mobile data collection device 140, network 150 and back-end system 155.

Meter 110 may include a device configured to measure usage of a resource, such as water, gas, etc. In an exemplary implementation in which meter 110 is a water meter, meter 110 may use different measurement technologies to measure water usage. For example, meter 110 may include an ultrasonic water meter that uses ultrasonic transducers, a positive displacement meter, a turbine meter, a velocity based meter, a compound meter, a magnetic meter, etc., to measure usage of the particular resource.

MIU 120 may include a device that collects, analyzes and stores data from meter 110. In one exemplary implementation, MIU 120 may be integrated into meter 110. That is, meter 110 and meter interface unit 120 may be a single component. In other exemplary implementations, MIU 120 or a portion of MIU 120 may be a separate component from meter 110. For example, MIU 120 may be located externally with respect to meter 110 and may be coupled to meter 110 via a wired or wireless connection. MIU 120 may also include one or more wireless transmitters and receivers to provide wireless communication capability for transmitting a current meter reading.

For example, in some implementations, MIU 120 may include cellular communication capability (e.g., a fourth generation long term evolution (4G LTE) wireless communication capability, a fifth generation (5G) wireless communication capability, etc.) to allow MIU 120 to transmit and/or receive data (e.g., transmit the current meter reading, historical/previous meter readings, a meter identifier, consumption flags, etc., and receive instructions/data from a remotely located back-end system, etc.). MIU 110 may also include a second wireless communication capability, such as one or more transmitters, receivers and/or transceivers to allow MIU 120 to transmit and/or receive data to/from systems within radio frequency (RF) range of MIU 120 (e.g., a distance ranging from less than 100 feet to over 1-2 miles). For example, when a cellular connection from MIU 120 is experiencing problems, MIU 120 may transmit a current meter reading to mobile data collection device 140 via RF communication, referred to herein as a mobile transmission.

Access network 130 may include a radio access network (RAN) that provides a connection between meter 110, MIU 120 and network 150. For example, access network 130 may be associated with a communication network, such as a 4G LTE network, a 5G network, etc. Access network 130 may include a large number of base stations, with one base station 132 shown for simplicity. Each base station 132 may service a set of user equipment devices that include meter 110 and MIU 120. Base station 132 may connect MIU 120 to access network 130 and network 150 to allow MIU 120 to provide meter reading data to back-end system 155.

In one implementation, base station 132 may include a 4G base station (e.g., an evolved NodeB (eNodeB). In other implementations, base station 132 may include a 5G base station (e.g., a next generation NodeB (gNodeB). In each case, base station 132 may include one or more radio frequency (RF) transceivers to receive communications from MIU 120 and to communicate with other elements in environment 100, such as back-end system 155.

Mobile data collection device 140 may include a device or system configured to receive and store data from MIU 120. For example, mobile data collection device 140 may be implemented as a mobile or handheld device (e.g., operated by a technician associated with a utility company, such as a water company), a vehicle mounted device or another mobile device (e.g., a drone). Mobile data collection 140 may be configured to obtain meter data from meter 110 via MIU 120 when a problem occurs with respect to transmitting data to back-end system 155 via a cellular connection (e.g., via access network 130 and/or network 150). Mobile data collection device 140 may also be configured to communicate with back-end system 155.

Mobile data collection device 140 may also be configured to operate in one or multiple communication modes (e.g., one-way, two-way, etc.). According to one exemplary implementation, mobile data collection device 140 may receive one-way data packets transmitted from MIU 120 that include meter reading data from meter 110. In other implementations, mobile data collection device 140 may transmit instructions or queries to MIU 120 and receive meter reading data in response. In still other implementations, mobile data collection device 140 may connect to MIU 120 via a cable to obtain meter reading data.

Network 150 may include one or more wired, wireless and/or optical networks that are capable of receiving and transmitting data, voice and/or video signals. For example, network 150 may include one or more public switched telephone networks (PSTNs) or other type of switched network. Network 150 may further include one or more satellite networks, one or more packet switched networks, such as an Internet protocol (IP) based network, a software defined network (SDN), a local area network (LAN), a WiFi network, a Bluetooth network, a wide area network (WAN), a 4G LTE Advanced network, a 5G network, an intranet, or another type of network that is capable of transmitting data. In one implementation, network 150 may provide packet-switched services and wireless Internet protocol (IP) connectivity to various components in environment 100, such as meters 110 and MIUs 120, to allow MIUs 120 to transmit meter reading data to back-end system 155 and other devices/systems.

Back-end system 155 may include one or more devices and/or systems associated with obtaining meter reading data from meter 110. Back-end system 155 may be associated with a utility, such as a water company, gas company, an electric company, etc. In each case, back-end system 155 may obtain meter data on a periodic basis and bill the customer for resource usage. In an exemplary implementation, back-end system 155 may generate an alert when meter reading data has not been obtained in a predetermined period of time. In such situations, back-end system 155 may dispatch in-field personnel to obtain meter reading data via mobile data collection device 140. In some implementations, back-end system 155 may also include a host system that is able to send commands to MIU 120, such as commands associated with setting and modifying cellular and mobile transmission intervals, changing power levels associated with transmissions, etc.

The exemplary configuration illustrated in FIG. 1 is provided for simplicity. It should be understood that a typical environment may include more or fewer devices than illustrated in FIG. 1. For example, environment 100 may include a large number (e.g., thousands or more) of meters 110, MIUs 120, base stations 132, mobile data collection devices 140, as well as multiple access networks 130 and back-end system 155. Environment 100 may also include elements, such as gateways, routers, monitoring devices, network elements/functions, etc. (not shown), that aid in routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device. For example, as discussed above, in some implementations, meter 110 and MIU 120 may be combined into a single device.

Figure 2:
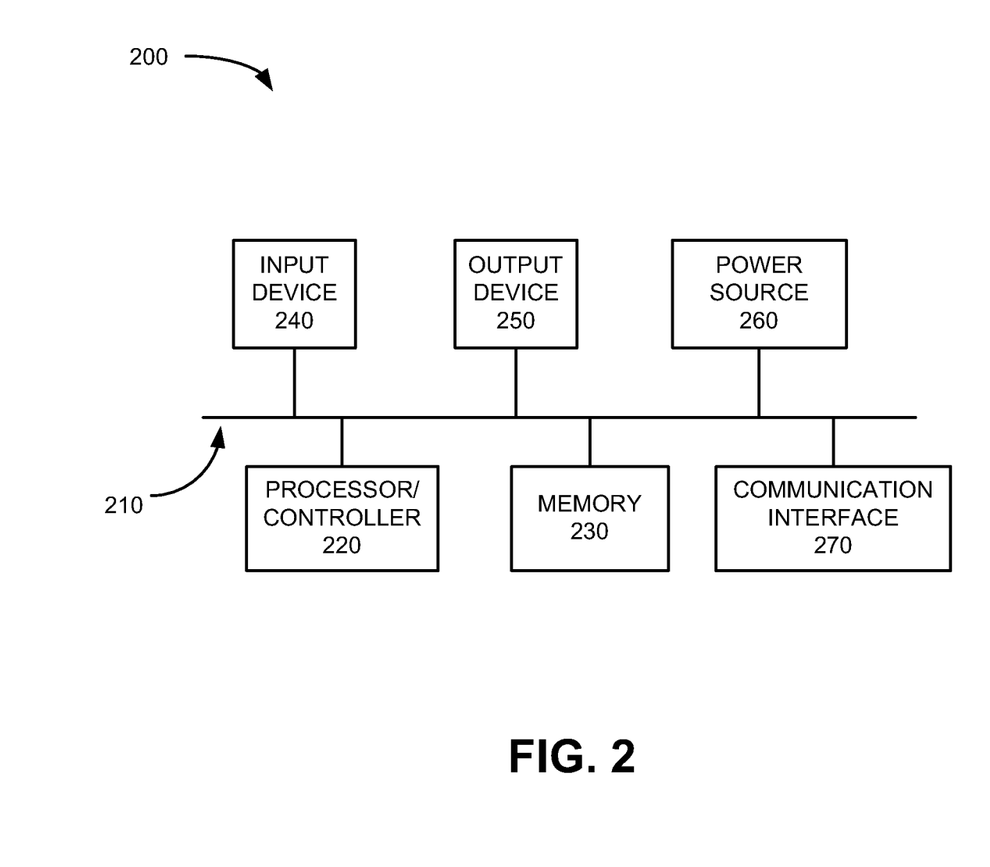
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in meter 110, MIU 120, base station 132, mobile data collection device 140, back-end system 155 and/or other devices included in environment 100. Referring to FIG. 2, device 200 may include bus 210, processor/controller 220, memory 230, input device 240, output device 250, power source 260 and communication interface 270. The exemplary configuration illustrated in FIG. 2 is provided for simplicity. It should be understood that device 200 may include more or fewer components than illustrated in FIG. 2.

Bus 210 may include a path that permits communication among the elements of device 200. Processor/controller 220 (also referred to herein as processor 220 and/or controller 220) may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250. Power source 260 may include a battery or other electrical power source for supplying power to device 200.

Communication interface 270 may include one or more transmitters, receivers and/or transceivers that device 200 uses to communicate with other devices via wired, wireless or optical mechanisms. For example, when implemented in MIU 120, communication interface 270 may include one or more RF transmitters, receivers and/or transceivers and one or more antennas for transmitting and receiving RF data via a cellular connection (e.g., with access network 130) and one or more RF transmitters, receivers and/or transceivers and one or more antennas for transmitting and receiving RF data via relatively short range RF link (e.g., with mobile data collection device 140). Communication interface 270 may operate in accordance with one or more communication standards and may include various processing logic and/or circuitry (e.g., multiplexing/de-multiplexing, filtering, amplifying, converting, error correction, etc.) Communication interface 270 may also include a modem or an Ethernet interface to a LAN or other mechanisms for communicating with elements in a network.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 270. Alternatively, hard-wired circuitry may be used in place of or in combination with software instructions to implement processes consistent with the implementations described herein. Thus, implementations described herein are not limited to any specific combination of hardware circuitry and software.

As described above, companies and service providers that provide resources, such as a water utility, obtain meter readings on a periodic basis, such as daily, weekly, monthly, etc. In typical situations, MIU 120 transmits the meter readings to back-end system 155 via cellular communications. In situations in which access network 130, network 150 and/or MIU 120's cellular interface is experiencing a problem, the water utility may use a backup method of obtaining meter reading data that includes deploying in-field mobile data collection device 140 to obtain meter reading data, as described below.

Figure 3:
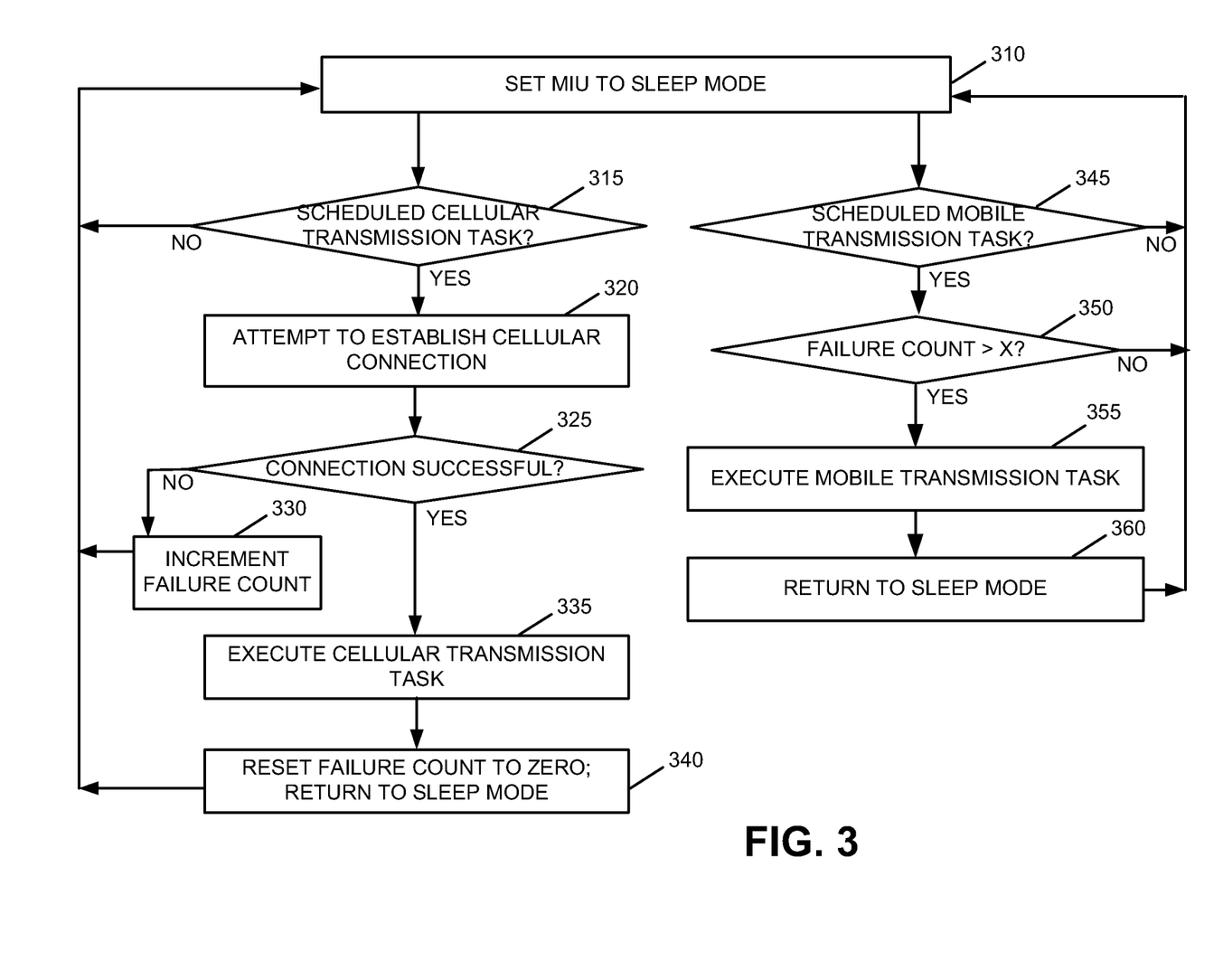
FIG. 3-7 are flow diagrams illustrating processing associated with using mobile transmissions from a meter interface unit as a backup in the environment of FIG. 1 in accordance with exemplary implementations.

FIG. 3 is a flow diagram illustrating processing associated with environment 100 in accordance with an exemplary implementation. In this implementation, mobile message transmission may be disabled for normal operations (e.g., when cellular communications from MIU 120 are successfully received by back-end system 155 in network 150) and mobile message transmissions are enabled for exceptional operations (e.g., when cellular communications from MIU 120 are not successfully received by back-end system 155). Processing may begin with controller 220 putting MIU 120 into a sleep mode (block 310). Prior to entering the sleep mode, MIU 120 may power down most functions to conserve power and awake to check for both scheduled cellular transmissions and scheduled mobile transmissions. For example, in an exemplary implementation, mobile transmission tasks may be scheduled for every 30 seconds plus some random offset time and cellular transmission tasks may be scheduled every six hours plus some random offset time. In some implementations, mobile transmission tasks may only be scheduled during certain hours of the day and/or days of the week, such as 9:00 AM to 5:00 PM on Monday-Friday, or some other schedule set by, for example, a utility company. This may help conserve battery life of MIU 120 in situations in which it is unlikely that personnel associated with mobile data collection device 140 are working, thereby reducing the probability that mobile data readings will be successfully received. In one implementation, MIU 120 may awake every predetermined period of time (e.g., every one second, 15 seconds, one minute, etc.) to determine if any tasks, such as cellular transmission tasks, mobile transmission tasks, etc., are scheduled. If no tasks are scheduled, MIU 120 may return to the sleep mode.

Assume that MIU 120 wakes up. Controller 220 may determine whether a current time corresponds to the time for a scheduled cellular transmission task, such as the time when MIU 120 is scheduled to transmit a meter reading for meter 110 (block 315). If the current time does not correspond to a time for a scheduled cellular transmission task (block 315—no), MIU 120 may return to the sleep mode. MIU 120 may then wake at the next scheduled time and controller 220 may again determine if any cellular and mobile transmission tasks are scheduled. If, however, the current time corresponds to the time for a scheduled cellular transmission task (block 315—yes), controller 220 may attempt to establish a cellular connection with, for example, access network 130 and ultimately with back-end system 155 in network 150 (block 320).

If MIU 120 is unable to successfully establish a cellular connection with access network 130, such as establish a connection with base station 132, and establish a connection with back-end system 155 in network 150 (block 325—no), controller 220 may increment a failure count, which is initially set to zero (block 330), and MIU 120 may return to the sleep mode. In one implementation, MIU 120 may determine that a successful cellular connection has not been established in response to receiving no acknowledgment indication from base station 132 that a connection has been established and/or being unable to establish a connection with back-end system 155 in network 150 and successfully transmitting meter reading data to back-end system 155. For example, in some implementations, back-end system 155 may send an acknowledgement to MIU 120 upon successful reception of meter reading data. If, however, MIU 120 is able to establish a cellular connection and establish a connection with back-end system 155 (block 325—yes), MIU 120 may execute the cellular transmission task, such as transmit meter reading data from meter 110 (block 335). In an exemplary implementation, the meter reading data may include a current meter reading of meter 110 and a meter identifier associated with meter 110. After successfully executing the cellular transmission task, controller 220 may receive an acknowledgement from back-end system 155, reset the failure count to zero and return to the sleep mode (block 340).

MIU 120 may also awake from sleep mode and determine if any mobile transmission tasks are scheduled. For example, MIU 120 may wake and controller 220 may determine whether a current time corresponds to the time for a scheduled mobile transmission task, such as the time for transmitting meter reading data from meter 110 via a mobile transmission (block 345). As discussed above, in an exemplary implementation, mobile transmissions may be scheduled every 30 seconds, plus some random offset time. If the current time does not correspond to a time for a scheduled mobile transmission task (block 345—no), MIU 120 may return to the sleep mode. If, however, the current time corresponds to the time for a scheduled mobile transmission task (block 345—yes), controller 220 may determine whether the failure count is greater than a predetermined value (block 350). For example, in one implementation, the predetermined value may be 12, indicated that 12 previous cellular connection attempts from MIU 120 to, for example, access network 130 and/or back-end system 155 via network 150 have failed. If the failure count is not greater than the predetermined value (block 350—no), MIU 120 may return to the sleep mode. If, however, the failure count is greater than the predetermined value, and optionally that the current time corresponds to a time associated with allowed mobile data transmissions, such as 9:00 AM to 5:00 PM on Monday-Friday (block 350—yes), MIU 120 may execute the mobile transmission task (block 355). For example, controller 220 may transmit a mobile transmission message one or more times. The mobile transmission message may include data associated with the meter reading of meter 110. Mobile data collection device 140 may be in RF range of MIU 120 and may receive the mobile transmission including the meter reading data. After executing the mobile transmission task, MIU 120 may return to the sleep mode (block 360).

In this manner, if MIU 120 is unable to establish a cellular connection (e.g., an LTE connection, a 5G connection, etc.) with back-end system 155 via access network 130 and network 150, MIU 120 may execute a mobile transmission to transmit the meter reading data to mobile data collection device 140.

Figure 4:
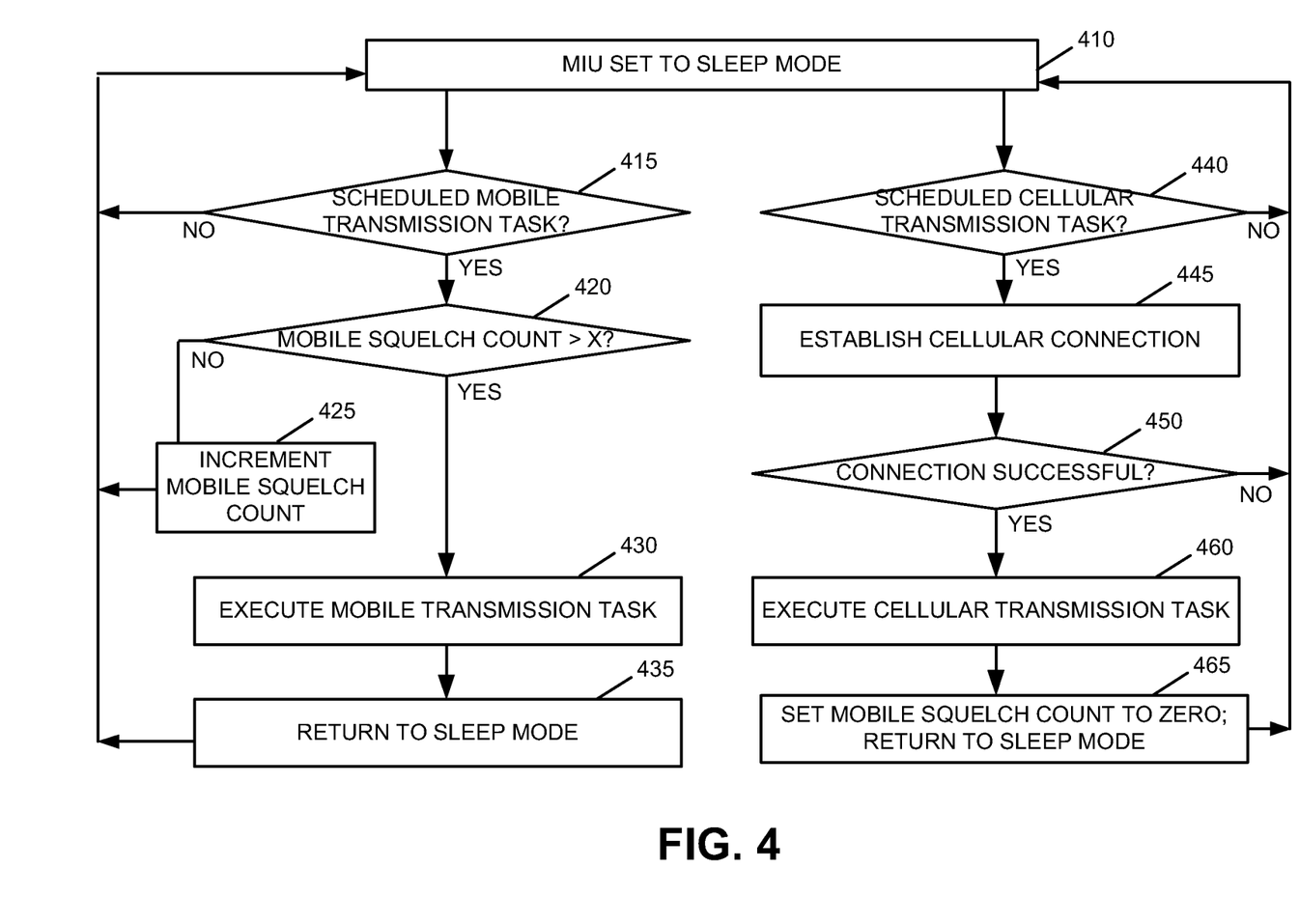

FIG. 4 is a flow diagram illustrating processing associated with environment 100 in accordance with another exemplary implementation. In this implementation, a default configuration associated with MIU 120 may include mobile message transmissions being enabled and becoming disabled or squelched for a period of time after a successful cellular transmission, as described below. Referring to FIG. 4, processing may begin with controller 220 putting MIU 120 into a sleep mode (block 410). As described above, prior to entering the sleep mode, MIU 120 may power down most functions to conserve power and awake for both scheduled cellular transmissions and scheduled mobile transmissions. For example, in an exemplary implementation, mobile transmission tasks may be scheduled for every 30 seconds plus some random offset time and cellular transmission tasks may be scheduled every six hours plus some random offset time. As also described above, MIU 120 may awake every predetermined period of time (e.g., every one second, 15 seconds, one minute, etc.) to determine if any tasks, such as cellular transmission tasks, mobile transmission tasks, etc., are scheduled. If no tasks are scheduled, MIU 120 may return to the sleep mode.

Assume that MIU 120 wakes up. Controller 220 may determine whether a current time corresponds to the time for a scheduled mobile transmission task (block 415). If the current time does not correspond to a time for a scheduled mobile transmission task (block 415—no), MIU 120 may return to the sleep mode. MIU 120 may then wake at the next scheduled time and controller 220 may again determine if any mobile and cellular transmission tasks are scheduled. If, however, the current time corresponds to the time for a scheduled mobile transmission task (block 415—yes), controller 220 may determine if a mobile squelch count is greater than a predetermined value (e.g., 8,500) (block 420). Controller 220 may initially set the mobile squelch count to zero. If the mobile squelch count is not greater than the predetermined value (block 420—no), controller 220 may increment the mobile squelch count (block 425) and MIU 120 may return to the sleep mode.

If, however, the mobile squelch count is greater than the predetermined value (block 420—yes), MIU 120 may execute the mobile transmission task (block 430). As discussed above, the mobile transmission message may include data associated with the meter reading of meter 110. Assume that mobile data collection device 140 is in RF range of MIU 120 and receives the meter reading data. After executing the mobile transmission task, MIU 120 may return to the sleep mode (block 435).

While in sleep mode, MIU 120 may also awake and check for scheduled cellular transmission tasks. For example, assume that MIU 120 wakes. Controller 220 may determine whether a current time corresponds to the time for a scheduled cellular transmission task (block 440). As discussed above, in an exemplary implementation, cellular transmissions may be scheduled every six hours plus some random offset time. If the current time does not correspond to a time for a scheduled cellular transmission task (block 440—no), MIU 120 may return to the sleep mode.

If, however, the current time corresponds to the time for a scheduled cellular transmission task (block 440—yes), controller 220 may attempt to establish a cellular connection with, for example, access network 130 and ultimately, establish a connection with back-end system 155 (block 445).

If MIU 120 is unable to successfully establish a cellular connection with access network 130, such as establish a connection with base station 132, and establish a connection with back-end system 155 (block 450—no), MIU 120 may return to the sleep mode. If, however, MIU 120 is able to successfully establish a cellular connection with access network 130 and establish a connection with back-end system 155 (block 450—yes), MIU 120 may execute the cellular transmission task (block 460). For example, controller 220 may transmit meter reading of meter 110 to back-end system 155 via access network 130. After successfully executing the cellular transmission task, controller 220 may reset the mobile squelch count to zero and MIU 120 may return to the sleep mode (block 465). In some implementations, MIU 120 may receive an acknowledgement from back-end system 155 indicating that the meter reading data was successfully received.

In this manner, each time MIU 120 is able to establish a cellular connection and transmit, for example, meter reading data to back-end system 155, the mobile transmission task may effectively become disabled or squelched for a period of time until the mobile squelch count reaches the predetermined mobile squelch count value.

Figure 5:
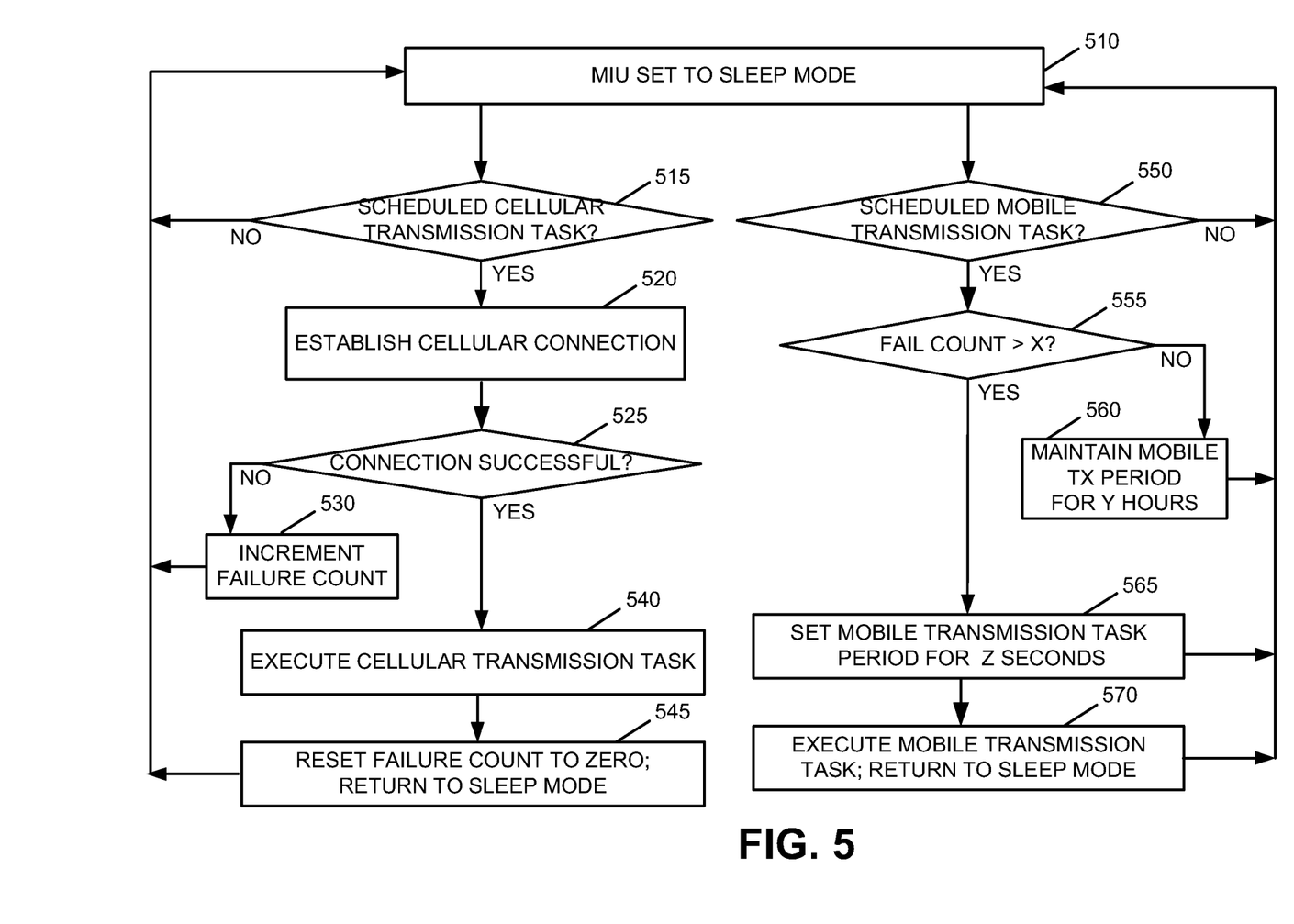

FIG. 5 is a flow diagram illustrating processing associated with environment 100 in accordance with a further exemplary implementation. In this implementation, a default configuration associated with MIU 120 may include mobile message transmissions always being enabled. However, the time between successive mobile transmission tasks may be modified based on the success/failure of cellular transmissions, as described in detail below.

Referring to FIG. 5, processing may begin with controller 220 putting MIU 120 into a sleep mode (block 510). Prior to entering the sleep mode, MIU 120 may power down most functions to conserve power and awake for both scheduled cellular transmissions and scheduled mobile transmission. For example, in an exemplary implementation, mobile transmission tasks may initially be scheduled for every four hours plus some random offset time and cellular transmission tasks may be scheduled every six hours plus some random offset time.

Assume that MIU 120 wakes up. Controller 220 may determine whether a current time corresponds to the time for a scheduled cellular transmission task (block 515). If the current time does not correspond to a time for a scheduled cellular transmission task (block 515—no), MIU 120 may return to the sleep mode. MIU 120 may then wake at the next scheduled time and controller 220 may again determine if any cellular transmission tasks are scheduled. If, however, the current time corresponds to the time for a scheduled cellular transmission task (block 515—yes), controller 220 may attempt to establish a cellular connection with, for example, access network 130, and establish a connection with back-end system 155 (block 520).

If MIU 120 is unable to successfully establish a cellular connection with access network 130, such as establish a connection with base station 132, and establish a connection with back-end system 155 (block 525—no), controller 220 may increment a failure count, which is initially set to zero (block 530), and MIU 120 may return to the sleep mode. If, however, MIU 120 is able to establish a cellular connection and establish a connection with back-end system 155 (block 525—yes), MIU 120 may execute the cellular transmission task, such as transmit meter reading data from meter 110 to back-end system 155 via access network 130 (block 540). MIU 120 may also reset the failure count to zero and return to the sleep mode (block 545). As described above, in some implementations, MIU 120 may receive an acknowledgement from back-end system 155 indicating that the meter reading data was successfully received.

As described above, MIU 120 may also awake from sleep mode and determine if any mobile transmission tasks are scheduled. For example, controller 220 may determine whether a current time corresponds to the time for a scheduled mobile transmission task (block 550). As discussed above, in an exemplary implementation, mobile transmissions may be scheduled every four hours plus some random offset time. If the current time does not correspond to a time for a scheduled mobile transmission task (block 550—no), MIU 120 may return to the sleep mode. If, however, the current time corresponds to the time for a scheduled mobile transmission task (block 550—yes), controller 220 may determine whether the failure count is greater than a predetermined value (block 555).

For example, in one implementation, the predetermined value may be 12, representing 12 previous cellular connection attempts from MIU 120 to access network 130 and/or back-end system 155 have failed. If the failure count is not greater than the predetermined value (block 555—no), MIU 120 may maintain the mobile transmission period to a predetermined value, such as every four hours, and return to the sleep mode (block 560). If, however, the failure count is greater than the predetermined value (block 555—yes), MIU 120 may set the mobile transmission period for a shorter period of time, such as every 30 seconds (block 565). MIU 120 may also execute the mobile transmission task (block 570).

For example, controller 220 may transmit a mobile transmission message one or more times. The mobile transmission message may include the meter reading of meter 110. Assume that mobile data collection device 140 is within RF range of MIU 120 and receives the meter reading data. After executing the mobile transmission task, MIU 120 may return to the sleep mode (block 570).

In this manner, if MIU 120 is unable to establish a cellular connection (e.g., an LTE connection, a 5G connection, etc.) with access network 130 and/or is unable to establish a connection with back-end system 155, MIU 120 may modify the mobile transmission period (e.g., to every 30 seconds) to ensure that MIU 120 will transmit meter data to mobile data collection device 140 on a more frequent basis. This may help ensure that mobile data collection device 140 is able to obtain meter reading data when mobile data collection device 140 is within RF range of MIU 120.

Figure 6:
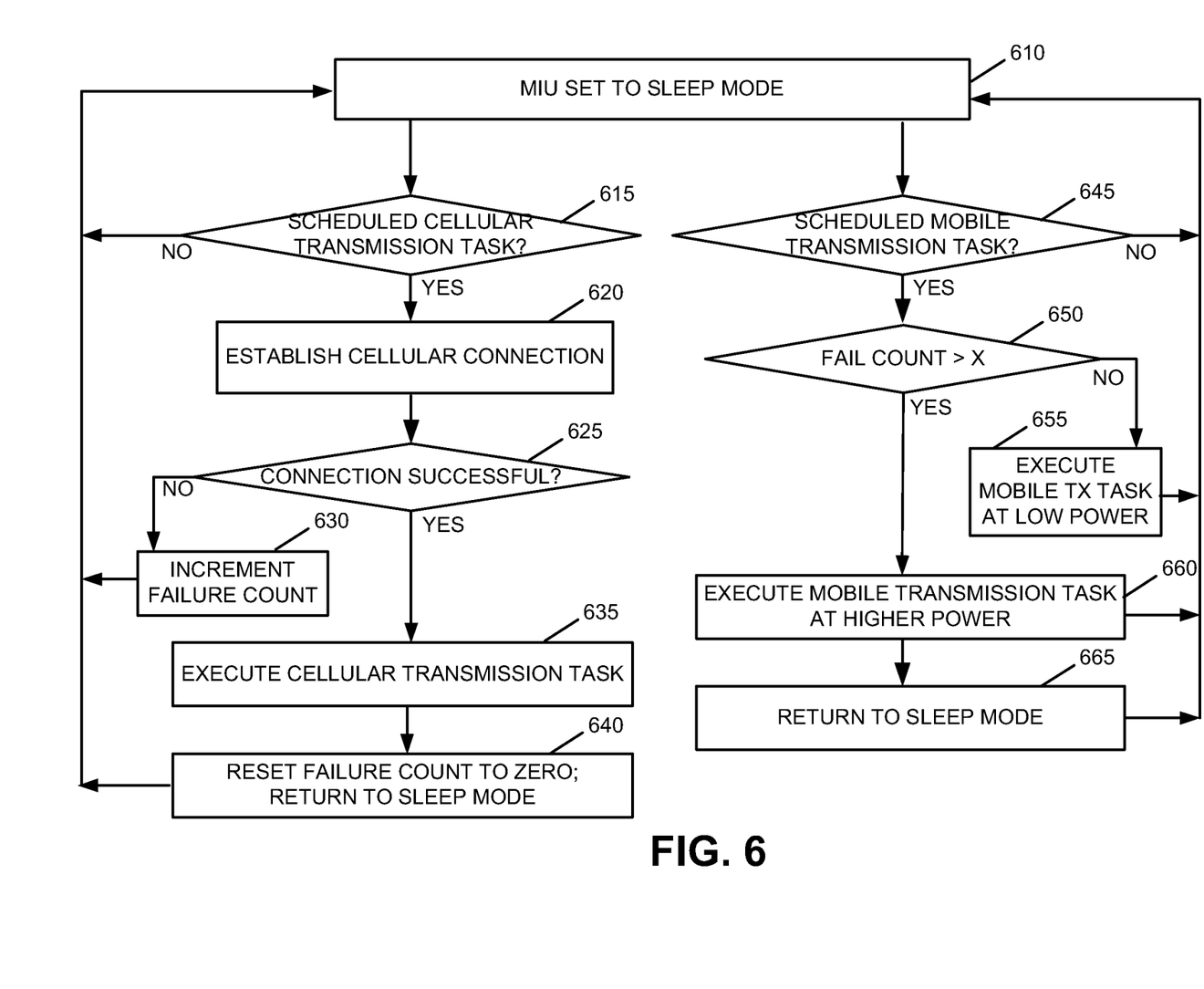

FIG. 6 is a flow diagram illustrating processing associated with environment 100 in accordance with another exemplary implementation. In this implementation, a default configuration associated with MIU 120 may include mobile message transmissions always being enabled. However, the power at which mobile transmissions are transmitted may be modified based on the success/failure of cellular transmissions, as described in detail below.

Referring to FIG. 6, processing may begin with controller 220 putting MIU 120 into a sleep mode (block 610). Prior to entering the sleep mode, MIU 120 may power down most functions to conserve power and awake for both scheduled cellular transmissions and scheduled mobile transmission. For example, in an exemplary implementation, mobile transmission tasks may be scheduled for every 30 seconds plus some random offset time and cellular transmission tasks may be scheduled every six hours plus some random offset time.

Assume that MIU 120 wakes up. Controller 220 may determine whether a current time corresponds to the time for a scheduled cellular transmission task (block 615). If the current time does not correspond to a time for a scheduled cellular transmission task (block 615—no), MIU 120 may return to the sleep mode. MIU 120 may then wake at the next scheduled time and controller 220 may again determine if any cellular and mobile transmission tasks are scheduled. If, however, the current time corresponds to the time for a scheduled cellular transmission task (block 615—yes), controller 220 may attempt to establish a cellular connection with, for example, access network 130, and ultimately with back-end system 155 (block 620).

If MIU 120 is unable to successfully establish a cellular connection with access network 130, such as establish a connection with base station 132, and establish a connection with back-end system 155 (block 625—no), controller 220 may increment a failure count, which is initially set to zero (block 630), and MIU 120 may return to the sleep mode. If, however, MIU 120 is able to establish a cellular connection and establish a connection with back-end system 155 (block 625—yes), MIU 120 may execute the cellular transmission task (block 635). For example, MIU 120 may transmit meter reading data from meter 110 to back-end system 155 via access network 130. MIU 120 may also reset the failure count to zero and return to the sleep mode (block 640). As described above, in some implementations, MIU 120 may receive an acknowledgement from back-end system 155 indicating that the meter reading data was successfully received.

As described above, MIU 120 may also awake from sleep mode and determine if any mobile transmission tasks are scheduled. For example, controller 220 may determine whether a current time corresponds to the time for a scheduled mobile transmission task (block 645). As discussed above, in an exemplary implementation, mobile transmissions may be scheduled every 30 seconds plus some random offset time. If the current time does not correspond to a time for a scheduled mobile transmission task (block 645—no), MIU 120 may return to the sleep mode.

If, however, the current time corresponds to the time for a scheduled mobile transmission task (block 645—yes), controller 220 may determine whether the failure count is greater than a predetermined value (block 650). For example, in one implementation, the predetermined value may be 12, representing 12 previous cellular connection attempts from MIU 120 to, for example, access network 130 and/or back-end system 155 have failed. If the failure count is not greater than the predetermined value (block 650—no), MIU 120 may execute the mobile transmission task at a low power level, such as 0 decibels per milliwatt (dBm) (block 655). The mobile transmission task transmitted at the low power level may include the meter reading of meter 110. After executing the mobile transmission task at the low power level, MIU 120 may return to the sleep mode.

If, however, the failure count is greater than the predetermined value (block 650—yes), MIU 120 may execute the mobile transmission at a higher power level, such as +20 dBm, one or more times (block 660). The mobile transmission message may include the meter reading of meter 110. After executing the mobile transmission task at the higher power level one or more times, MIU 120 may return to the sleep mode (block 665).

In this manner, if MIU 120 is unable to establish a cellular connection (e.g., an LTE connection, a 5G connection, etc.) with access network 130 and/or is unable to establish a connection with back-end system 155, MIU 120 may modify the mobile transmission power level to ensure that MIU 120 will transmit meter data to mobile transceiver 140, while also conserving battery power since the low power transmissions do not require much power. For example, if the failure count is not greater than the predetermined value, the low power mobile transmission from MIU 120 may not be received by mobile data collection device 140. However, since the low power mobile transmissions are transmitted at such low power (e.g., 0 dBm), the transmissions may not adversely impact the battery life of MIU 120.

Figure 7:
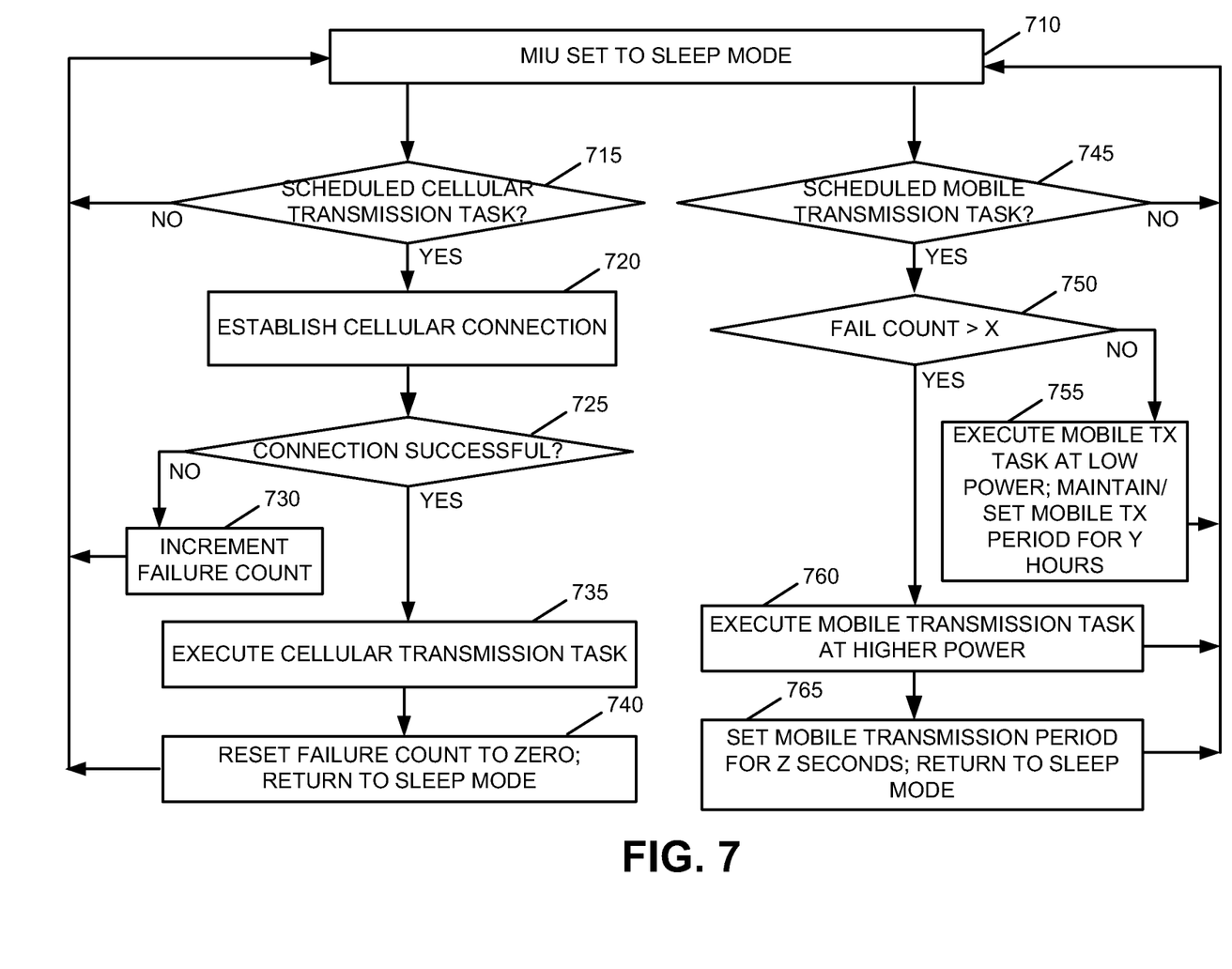

FIG. 7 is a flow diagram illustrating processing associated with environment 100 in accordance with another exemplary implementation. In this implementation, a default configuration associated with MIU 120 may include mobile message transmissions always being enabled. However, the time between successive mobile transmissions as well as the power at which mobile transmissions are transmitted may be modified based on the success/failure of cellular transmissions, as described in detail below.

Referring to FIG. 7, processing may begin with controller 220 putting MIU 120 into a sleep mode (block 710). Prior to entering the sleep mode, MIU 120 may power down most functions to conserver power and awake for both scheduled cellular transmission tasks and scheduled mobile transmission tasks. For example, in an exemplary implementation, mobile transmission tasks may be initially scheduled for every four hours plus some random offset time and cellular transmission tasks may be scheduled every six hours plus some random offset time.

Assume that MIU 120 wakes up. Controller 220 may determine whether a current time corresponds to the time for a scheduled cellular transmission task (block 715). If the current time does not correspond to a time for a scheduled cellular transmission task (block 715—no), MIU 120 may return to the sleep mode. MIU 120 may then wake at the next scheduled time and controller 220 may again determine if any cellular transmission tasks are scheduled. If, however, the current time corresponds to the time for a scheduled cellular transmission task (block 715—yes), controller 220 may attempt to establish a cellular connection with, for example, access network 130, and ultimately with back-end system 155 (block 720).

If MIU 120 is unable to successfully establish a cellular connection with access network 130, such as establish a connection with base station 132, and establish a connection with back-end system 155 (block 725—no), controller 220 may increment a failure count, which is initially set to zero (block 730), and MIU 120 may return to the sleep mode. If, however, MIU 120 is able to establish a cellular connection and establish a connection with back-end system 155 (block 725—yes), MIU 120 may execute the cellular transmission task, such as transmit meter reading data from meter 110 (block 735). MIU 120 may also reset the failure count to zero and return to the sleep mode (block 740). As described above, in some implementations, MIU 120 may receive an acknowledgement from back-end system 155 indicating that the meter reading data was successfully received.

As described above, while in sleep mode, MIU 120 may also awake from sleep mode and determine if any mobile transmission tasks are scheduled. For example, MIU 120 may wake and controller 220 may determine whether a current time corresponds to the time for a scheduled mobile transmission task (block 745). As discussed above, in an exemplary implementation, mobile transmissions may be scheduled every four hours plus some random offset time. If the current time does not correspond to a time for a scheduled mobile transmission task (block 745—no), MIU 120 may return to the sleep mode. If, however, the current time corresponds to the time for a scheduled mobile transmission task (block 745—yes), controller 220 may determine whether the failure count is greater than a predetermined value (block 750). For example, in one implementation, the predetermined value may be 12, representing 12 previous cellular connection attempts from MIU 120 to, for example, access network 130 and/or back-end system 155 have failed. If the failure count is not greater than the predetermined value (block 750—no), MIU 120 may execute the mobile transmission task at a low power level, such as 0 dBm (block 755). After executing the mobile transmission task at the low power level, MIU 120 may maintain or set the mobile transmission schedule to a predetermined time period, such as every four hours, and return to the sleep mode.

If, however, the failure count is greater than the predetermined value (block 750—yes), MIU 120 may execute the mobile transmission at a higher power level, such as +20 dBm, one or more times (block 760). The mobile transmission message may include data associated with the meter reading of meter 110. After executing the mobile transmission task at the higher power level one or more times, MIU 120 may set the mobile transmission schedule period to a shorter period of time, such as every 30 seconds and return to the sleep mode (block 765).

In this manner, if MIU 120 is unable to establish a cellular connection (e.g., an LTE connection, a 5G connection, etc.) with access network 130 and/or is unable to establish a connection with back-end system 155, MIU 120 may modify the mobile transmission power level (e.g., increase the power level) as well as modify the mobile transmission schedule period (e.g., increase the frequency, such as decrease the transmission interval, of mobile transmissions). This will ensure that MIU 120 will transmit meter data to mobile data collection device 140 on a more frequent basis and a higher power when a predetermined number of cellular transmissions have failed, while also conserving battery power when a successful cellular transmission has been made.

In some implementations, a utility, such as a water utility may not receive "fresh" meter reading data and dispatch in-field technicians/personnel to obtain meter reading data via mobile data collection device 140. However, in some instances, back-end system 155 may receive a fresh meter reading from MIU 120 via access network 130 after a technician has already been dispatched to obtain a meter reading via mobile data collection device 140. In some implementations, mobile data transmissions may overlap for a period of time after a successful cellular transmissions to avoid a situation in which the in-field technician is unable to receive a meter reading via mobile data collection device 140 since the mobile data transmissions have been squelched/disabled for a period of time or have been transmitted at the lower power level (e.g., 0 dBm). For example, in one implementation, mobile transmissions may overlap or continue for a period of time, such as a period of 12 hours, 24 hours, 48 hours or some other period of time after a successful cellular transmission and the in-field technician has been dispatched to obtain a current meter reading.

In this manner, mobile transmission may not be squelched, disabled or transmitted at the low power level (e.g., 0 dBm) during this overlapping period. That is, mobile transmissions may continue and/or continue to be transmitted at the higher power level during the overlap period when a technician has been dispatched. In this manner, a technician using mobile data collection device 140 may receive a mobile transmission when within RF range of MIU 120, as opposed to not receiving any mobile transmission and assuming that the MIU 120 is non-functional. This may help avoid the technician issuing a trouble ticket to replace MIU 120 and/or attempt to troubleshoot MIU 120. This may also save costs associated with replacing and/or performing unnecessary maintenance of functional MIUs 120.

Implementations described herein allow a utility to receive meter reading data via cellular transmissions during normal operating conditions and receive meter reading data via mobile transmissions to an in-field mobile data collection device as a backup when cellular transmissions have failed a number of times. In this manner, a backup method of transmitting data is provided while not adversely impacting the battery life of the meter interface unit. Implementations described herein may also ensure that an in-field technician does not incorrectly determine that a meter interface unit 120 is not working properly by overlapping mobile transmissions after a successful cellular transmission when personnel have already been dispatched This allows a utility to avoid unnecessary maintenance and replacement costs associated with fully operational MIUs 120.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to transmitting cellular and mobile data transmissions at particular frequencies or transmission intervals and/or power levels. It should be understood that the particular frequencies/transmission intervals and/or power levels are exemplary only and other frequencies/transmission intervals and/or power levels may be used. For example, in accordance with exemplary implementations, the particular frequency/transmission interval of both cellular and mobile data transmissions as well as the power level for such transmissions may be based on the battery life of MIU 120. For example, the battery of an MIU 120 may be expected to last a number of years (e.g., 10 or more years). In such cases, the frequency/transmission interval and/or power levels associated with transmitting meter reading data may be selected to ensure that the battery life of MIU 120 is able to meet its intended life expectancy.

Further, features have been described above with respect to modifying the transmission interval and/or power level associated with mobile data transmissions intended for mobile data collection device 140. In some implementations, mobile data collection device 140 may include a receiver and a transmitter. For example, mobile data collection device 140 may receive mobile data transmissions from an end device, such as MIU 120, and also transmit commands to the end device, such as MIU 120. In such implementation, MIU 120 may include a receiver. However, the receiver at MIU 120 may not always be enabled. In such cases, the receiver of MIU 120 may be configured to be enabled based on evaluating the success of cellular transmissions with meter reading data from MIU 120 to back-end system 155. For example, in situations in which the cellular transmissions from MIU 120 are successfully received by back-end system 155, the receiver at MIU 120 may be enabled less often (or not at all) than in situations in which the cellular transmissions from MIU 120 are not successfully received. In one implementation, the receiver of MIU 120 may be enabled when mobile transmissions are scheduled from MIU 120. In this manner, battery power may be conserved by enabling the receiver of MIU 120 based on evaluation of the success of cellular transmissions from MIU 120.

In addition, features have been described above with respect to incrementing a failure count each time an attempted connection with back-end system 155 via network 130 fails. In other implementations, a failure count threshold may be set to some predetermined value and decremented each time an attempted connection fails. In such implementations, a mobile backup may be executed when the failure count reaches zero.

In still other implementations, a time threshold may be set as opposed to a failure count. For example, a time threshold such as 24 hours, 48 hours, etc., may be set. In such implementations, MIU 120 may determine if a successful cellular transmission has been made and if so, reset the threshold time value. If the time in which a successful meter reading being received by back-end system 155 reaches the predetermined time threshold, MIU 120 may execute a mobile transmission to transmit the meter reading data to mobile data collection device 140.

Still further, implementations described herein refer to modifying a mobile data transmission schedule and/or a power level associated with mobile data transmissions based on evaluating a metric associated with the success of cellular transmissions to back-end system 155. In other implementations, mobile data transmissions may be disabled during normal operating conditions and be set to a predetermined frequency and/or power level after the cellular transmissions have failed a predetermined number of times or over a predetermined period of time.

As described above, MIU 120 may be scheduled to wake up at predetermined times and determine whether a current time corresponds to the time for a scheduled cellular transmission task and/or a scheduled mobile transmission task. MIU 120 may also be scheduled to transmit mobile transmission messages at predetermined times, which may be based on an error count associated with cellular transmissions. In some implementations, the period for mobile transmission tasks may be reduced to increase the likelihood that mobile data collection device 140 successfully receives the mobile transmission, which may include meter reading data, in situations in which both cellular and mobile data transmissions have not been successfully received. For example, MIU 120 may be programmed by a host system such as back-end system 155 or another system, to reduce the period for mobile transmissions from, for example, every 30 seconds to every 10 seconds when both cellular and mobile transmissions have not been successfully received for a period of time. In this manner, by reducing the period for mobile transmissions, mobile data collection device 140 will potentially receive more transmissions in a fixed period of time, and increase the probability of successful reception of the data message. In other implementations, MIU 120 may be programmed by a host system (e.g., back-end system 155) to increase the period of the mobile transmissions, such as from every 30 seconds to every one minute, 2 minutes, etc. in situations in which no problems associated with either cellular or mobile transmission have occurred. In this manner, battery life of MIU 120 may be conserved.

In some implementations and as described with respect to FIG. 3, MIU 120 may be programmed to perform mobile transmission tasks only during certain hours, such as during typical working hours (e.g., 9:00 AM to 5:00 PM on Monday-Friday) or based on a schedule set by, for example, a utility company. By setting a schedule associated with typical times when personnel associated with operating mobile data collection device 140 are working, MIU 120 may avoid performing mobile transmission tasks and correspondingly conserve battery power at times when successful mobile reading of MIU 120 by mobile data collection device 140 is unlikely.

For example, setting a schedule for mobile transmission tasks to typical working hours may avoid performing mobile transmission tasks after normal working hours, on weekends, on holidays, etc., when mobile data messages are unlikely to be successfully received by mobile data collection device 140. Setting a schedule associated with limiting mobile transmission tasks to certain times of the day and/or days of the week may also be used in the implementations described above with respect to FIGS. 4-7 or any other implementations described herein. Still further, in some implementations, the setting of the transmission interval for mobile transmissions may be combined with scheduling transmissions based on typical working hours and days of the week to optimize read success rates for mobile transmissions and increase energy efficiency/conserve battery life of MIU 120.

In addition, features have been described above with respect to MIU 120 transmitting meter reading data to back-end system 155. In other implementations, MIU 120 may transmit other data and/or receive data from devices in environment 100, such as software updates. In such cases, cellular communications may be used as the primary communication method for MIU 120 and mobile transmissions may be used as a backup in a manner similar to that described above.

Further, while series of acts have been described with respect to FIGS. 3-7, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
   at least one communication interface; and
   a processor configured to:
   schedule a first transmission task and a second transmission task, wherein the first transmission task is associated with a cellular communication network and the second transmission task is associated with a communication for reception by a mobile data collection device,
   determine, at a first time, that the first transmission task is scheduled,
   execute the first transmission task,
   determine whether the first transmission task was successful,
   increment an error count in response to determining that the first transmission task was not successful,
   determine, at a second time when the second transmission task is scheduled, whether the error count is greater than a predetermined value, and
   modify or set at least one of a transmission interval or power level associated with the second transmission task based on the error count,
   wherein when modifying or setting, the processor is configured to at least one of:
   decrease a transmission interval at which the second transmission task is executed in response to determining that the error count is greater than the predetermined value, or
   reduce a power level associated with the second transmission task in response to determining that the error count is not greater than the predetermined value.

2. The device of claim 1, wherein the second transmission task comprises transmitting meter data from a meter suitable for collection by the mobile data collection device.

3. The device of claim 1, wherein the at least one communication interface comprises a first communication interface and a second communication interface, and
   wherein the first transmission task uses the first communication interface and the second transmission task uses the second communication interface.

4. The device of claim 3, wherein the first communication interface comprises a cellular communication interface.

5. The device of claim 1, wherein when modifying or setting, the processor is configured to:
   decrease the transmission interval at which the second transmission task is executed in response to determining that the error count is greater than the predetermined value.

6. The device of claim 1, wherein when modifying or setting, the processor is further configured to:
   reduce the power level associated with the second transmission task in response to determining that the error count is not greater than the predetermined value.

7. The device of claim 1, wherein when modifying or setting, the processor is configured to:

decrease the transmission interval at which the second transmission task is executed in response to determining that the error count is greater than the predetermined value, and
reduce the power level associated with the second transmission task in response to determining that the error count is not greater than the predetermined value.

8. The device of claim 1, wherein the metric error count comprises a failure count or a time value.

9. The device of claim 1, wherein the processor is further configured to:
execute the second transmission task for a period of time after the first transmission task has been successfully executed.

10. The device of claim 1, wherein the processor is further configured to:
execute the second data transmission task at a power level and transmission interval based on a battery condition of the device.

11. The device of claim 1, wherein the device comprises a meter interface unit coupled to a meter.

12. The device of claim 11, wherein the meter comprises a water meter and the device further comprises the water meter.

13. The device of claim 1, wherein the processor is further configured to:
execute the second transmission task at the reduced power level, wherein the reduced power level is approximately 0 decibel milliwatts (dBm).

14. A method, comprising:
scheduling a first transmission task and a second transmission task, wherein the first transmission task is associated with a cellular communication network and the second transmission task is associated with a communication for reception by a mobile data collection device;
determining, at a first time, that the first transmission task is scheduled;
attempting to execute the first transmission task;
determining whether the first transmission task was successful;
incrementing an error count in response to determining that the first transmission task was not successful;
determining, at a second time when the second transmission task is scheduled, whether the error count is greater than a predetermined value; and
modifying or setting at least one parameter associated with a second transmission task based on the error count,
wherein the modifying or setting comprises at least one of:
decreasing a transmission interval at which the second transmission task is executed in response to determining that the error count is greater than the predetermined value, or
reduce a power level associated with the second transmission task in response to determining that the error count is not greater than the predetermined value.

15. The method of claim 13, wherein the modifying or setting comprises:
decreasing the transmission interval at which the second transmission task is executed.

16. The method of claim 14, wherein the modifying or setting further comprises:
increasing a power level associated with the second transmission task in response to determining that the error count is greater than the predetermined value.

17. The method of claim 14, wherein the modifying or setting comprises:
decreasing the transmission interval at which the second transmission task is executed, and
reducing the power level at which the second transmission task is executed.

18. The method of claim 14, further comprising:
executing the second transmission task for a period of time after the first transmission task has been successfully executed.

19. The method of claim 14, further comprising:
executing the first transmission task using a cellular interface.

20. The method of claim 19, further comprising:
executing the second transmission task, wherein the second transmission task comprises:
transmitting meter data suitable for collection by the mobile data collection device.

21. The method of claim 14, further comprising:
setting a schedule associated with the second transmission task based on at least one of working hours of a day or days of a week; and
limiting transmissions associated with the second transmission task based on the schedule.

22. The method of claim 14, further comprising:
executing the second transmission task at the reduced power level such that a transmission associated with the second transmission task is unlikely to be received by the mobile data collection device.

23. A non-transitory computer-readable medium having stored thereon sequences of instructions which, when executed by at least one processor included in a device, cause the at least one processor to:
determine that a first transmission task is scheduled;
attempt to execute the first transmission task;
determine whether the first transmission task was successful;
increment an error count in response to determining that the first transmission task was not successful;
determine, at a second time when the second transmission task is scheduled, whether the error count is greater than a predetermined value; and
modify or set at least one of a transmission interval or power level associated with a second transmission task based on the error count,
wherein when modifying or setting, the instructions cause the at least one processor to at least one of:
decrease a transmission interval at which the second transmission task is executed in response to determining that the error count is greater than the predetermined value, or
reduce a power level at which the second transmission task is executed in response to determining that the error count is not greater than the predetermined value.

24. The non-transitory computer-readable medium of claim 23, wherein when modifying or setting, the instructions cause the at least one processor to:
decrease the transmission interval at which the second transmission task is executed, and
reduce the power level at which the second transmission task is executed.

* * * * *

UNITED STATES PATENT AND TRADEMARK OFFICE
CERTIFICATE OF CORRECTION

PATENT NO. : 11,737,027 B2
APPLICATION NO. : 17/488916
DATED : August 22, 2023
INVENTOR(S) : Troy Harstad et al.

It is certified that error appears in the above-identified patent and that said Letters Patent is hereby corrected as shown below:

In the Claims

Column 17, Claim 8, Line 9 should read:
The device of claim 1, wherein the error count Column 17, Claim 15, Line 61 should read:
The method of claim 14, wherein the modifying or Signed and Sealed this
Twenty-first Day of November, 2023

Katherine Kelly Vidal
*Director of the United States Patent and Trademark Office*